Oct. 27, 1931.  H. S. WALKER  1,828,794
SETTLING TANK
Filed Nov. 5, 1927  2 Sheets-Sheet 1

INVENTOR
HERBERT S. WALKER
By Townsend Loftus + Abbett
ATTORNEYS.

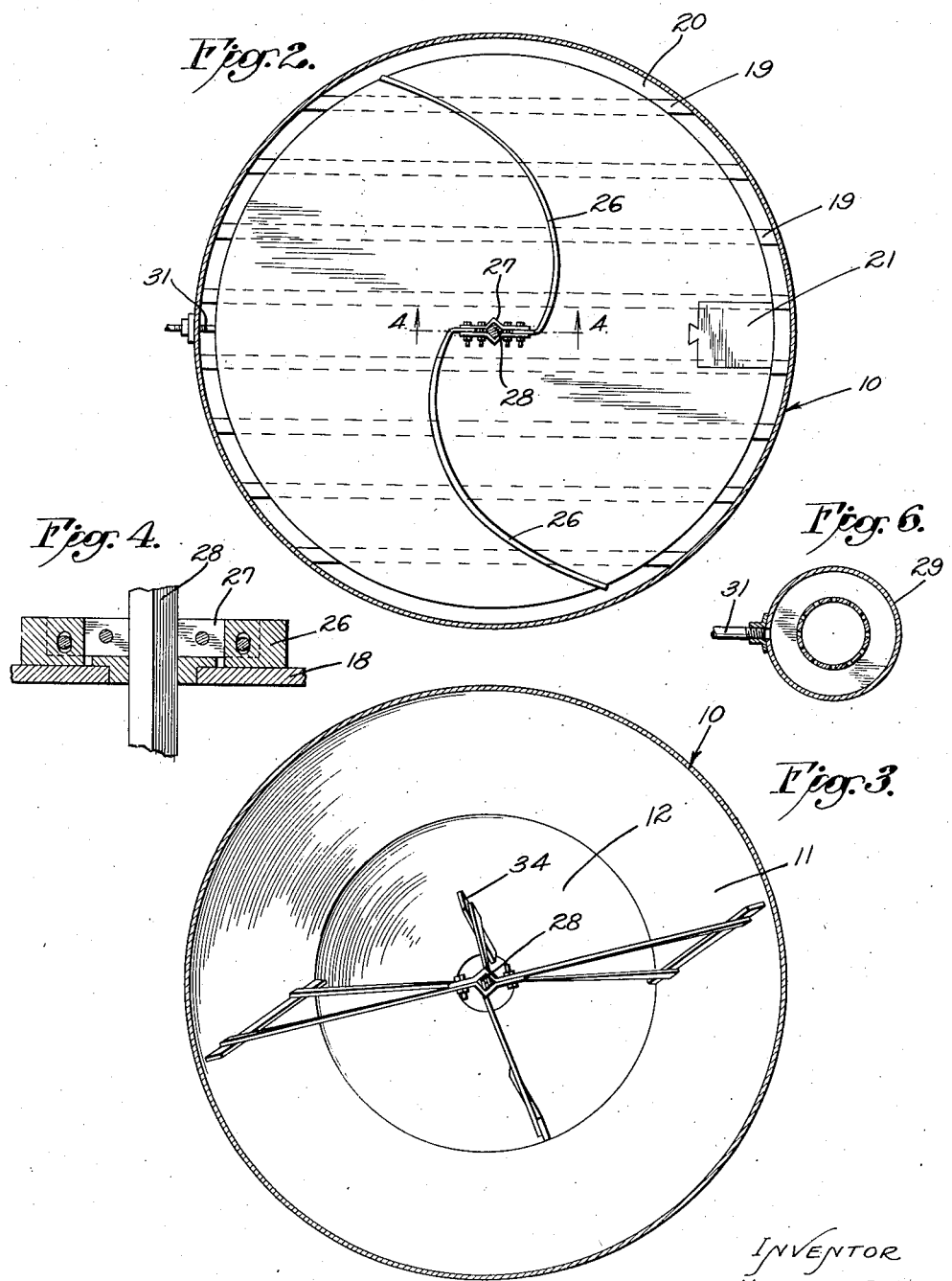

Patented Oct. 27, 1931

1,828,794

UNITED STATES PATENT OFFICE

HERBERT SAMUEL WALKER, OF BACOLOD, OCCIDENTAL NEGROS, PHILIPPINE ISLANDS

SETTLING TANK

Application filed November 5, 1927. Serial No. 231,166.

This invention relates to an improved tank for the gravitational settling of solids from liquids and is particularly applicable, although not necessarily confined, to the operation of insoluble impurities from sugar cane or sugar beet juices.

In the cane sugar industry, for example, it is customary to treat raw juices with lime or other clarifying agents, heat to boiling and pump to tanks in which the dirt, coagulated impurities and particles of cane fiber settle slowly to the bottom as "mud" the clear juice is drawn off by decantation and the lower layer of "mud" is discharged from the bottom of the tank. The original practice was to fill and discharge these tanks intermittently, but subsequently many schemes have been devised for tanks into which the dirty juice enters in a continuous stream and is continuously separated into "clear juice" and "mud".

An ideal arrangement for a continuous settling tank would be a very long shallow tank thru which the juice would flow in slow, uniform stream, with the clear juice outlet removed as far as possible from the dirty juice inlet. The difficulty of removing the sediment continuously, the great amount of floor space required and the greater cost of construction per unit volume of such a tank render it impracticable; therefore, it becomes necessary for economic reasons to utilize a round tank and devise baffles or partitions so to direct the flow of the juice that the clear juice outlet is far removed from the dirty juice inlet.

For separating heavy solids from light liquids, it is efficient and is simple to construct. In the case of sugar cane and sugar beet juices, however, the solids to be separated are of ununiform and varying composition. Some are of comparatively high density and settle quickly. Others may be very little heavier than the juice in which they are suspended. These settle so slowly that in a tank where the flow of juice is first downward, then upward, their rate of settling may be less than the rate of upward flow of the juice, resulting in imperfect separation. Also, when the density of the entering liquid varies and becomes temporarily lighter than the liquid in the main body of the tank, this lighter liquid, as soon as it reaches the bottom of the partition and starts upward, tends to rise rapidly thru the heavier liquid above it without immediately mixing, thus setting up rapid currents which disturb the settling process. Such a phenomenon may easily be demonstrated by partially filling a glass U tube with a raw sugar solution and pouring water slowly into one leg of the U. As soon as enough water has been added to more than fill one side and force its way to the other it may be seen to rise rapidly thru the heavier sugar solution. It is especially necessary to provide against this difficulty in tanks designed for use in settling cane and beet juices since these are continually varying in density and, to a lesser degree, in temperature.

In tanks in which the direction of flow is vertically downward in the center then obliquely upward to clear juice outlets at the periphery of each compartment, marked changes in density or in temperature will cause trouble, since a portion of juice hotter or lighter than that already in the tank will, after reaching the bottom of a compartment, have a tendency to rise faster than the bulk of juice in that compartment, carrying with it sediment and disturbing the settling.

In tanks in which the dividing cones are not so steep, making a more nearly horizontal flow of juice from the center outward and slightly upward, even a slight upward slope of the partitions, however, does cause any air bubbles or solids lighter than juice which may be carried down with the rapid flow down the center, to become entrapped and rise rapidly toward the clear juice outlets at the periphery of each compartment. Air binding may be prevented by providing air vents at the periphery of each compartment, but any scum or solids lighter than juice once entrapped in a compartment can emerge only through the clear juice outlets.

It is the object of the present invention therefore to provide a settling tank through which a liquid may be continuously passed at a maximum speed and within which a settling action will take place to effectually separate the liquid from the extraneous matter suspended therein.

The present invention contemplates the use of a round tank of diameter preferably somewhat greater than the height of the cylindrical portion. The exact proportions between diameter and height are immaterial to my invention, except that I have found that a comparatively wide tank gives more efficient settling than a very tall and narrow tank of the same volume, so that I prefer ordinarily to construct a tank of approximately the proportions shown in the drawings, having a bottom constructed in the form of a double cone and within which tank suitable intake, outlet and agitating means are provided to carry out the invention.

The invention is illustrated by way of example in the accompanying drawings.

Fig. 2 is a view in horizontal section as seen through the tank on the line 2—2 Fig. 1.

Fig. 3 is a view in horizontal section as seen through the tank on the line 3—3 of Fig. 1.

Fig. 4 is an enlarged fragmentary view in vertical section showing the manner of connecting the scrapers of the tank in driving relation to the central shaft, as seen on the line 4—4 of Fig. 2.

Fig. 6 is a sectional plan view as seen on line 6—6 of Fig. 1.

Figure 1:
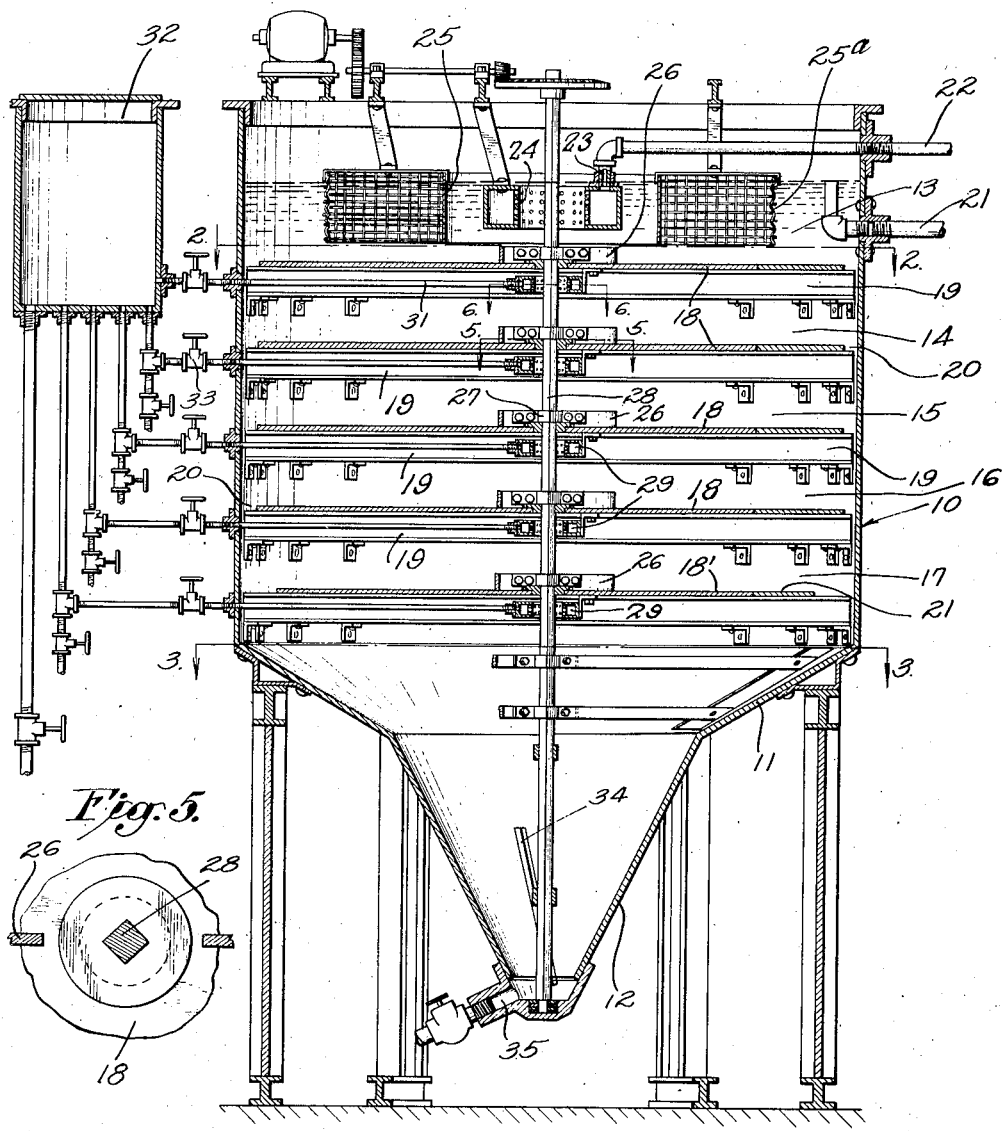
Figure 1 is a view in center vertical section through the settling tank with which my invention is concerned.
Figure 5:
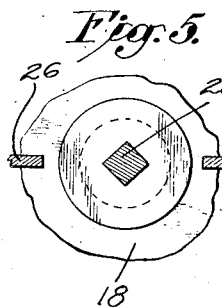
Fig. 5 is a fragmentary view in horizontal section and elevation as seen on the line 5—5 of Fig. 1, and as showing the manner in which the superposed compartments are closed around the drive shaft.

Referring more particularly to the drawings, 10 indicates a cylindrical settling tank the cylindrical side wall of which connects with an inverted frusto-conical wall section 11, connecting with an inverted conical bottom 12. The cylindrical portion of the tank is vertically divided into a plurality of settling compartments, here indicated as compartments 13, 14, 15, 16 and 17. These compartments are defined by the circular side wall of the tank and intermediate partition members 18, disposed in spaced superposed relation to each other in parallel horizontal planes within the tank. These partitions form floors for the several compartments and are supported upon cross rails 19 more clearly shown in Fig. 2 of the drawings. Attention is also directed to the fact that the floors 18 do not completely close off one compartment from the other, but that they are of a smaller outside diameter than the inside diameter of the cylindrical portion of the tank 10, thus forming an annular drain space 20 around the margin of the floors 18 and between it and the tank wall. It has been found preferable in practice to provide a space of from three to six inches between the outer edge of the circular floor plates and the sides of the tank, since this opening is sufficient to allow for passage of juice and mud from the top compartment to the lower ones without creating too high velocities, and at the same time utilizing nearly all of the available space in the tank.

It will of course be understood that the width of the annular space 20 may be varied according to the dictates of the designer or operator of the device without departing from the spirit of the invention, and in fact it may be found desirable to form the different floor plates 18 of different diameter as, for example; the lowermost floor plate 18′ which is shown as being of smaller diameter than the other plates. The distance between the floor plates 18 conforming the compartments 13 and 17 respectively may be varied accordingly as desired, although it has been found that a vertical distance of from one and one half to two and one half feet between successive partitions is satisfactory.

To provide for the entrance of workmen to the different compartments, a small approximately rectangular section 21 is cut near the periphery of each circular partition as shown in Fig. 2, where it rests on adjoining angle irons, reinforcing the under side of the edges of the cut section so that it lies flat when replaced and the cut edges are sealed against the passage of juice, but can be lifted out of the way without difficulty when necessary. This obviates the necessity for making manholes in the sides of the tank and simplifies construction.

Juice or other liquid to be treated is delivered to the machine through an induction pipe 22. This pipe has a down-turned end 23, connecting with a distributing box 24, which is disposed in the upper compartment 13 of the tank 10. This distributing box tends to reduce the velocity head of the incoming liquids and equalizes the discharge flow therefrom. The box 24 comprises an annular hollow ring preferably of rectangular section. The top, the bottom and the outside cylinder of this hollow ring are imperforate; the inside cylinder is perforated to allow the liquid, which comes in thru a pipe 23 flanged into the top of the ring, to escape through and all around the inside periphery of the ring. The size and number of these perforations is such that their total area is preferably several times the area of the inlet pipe. The action of this distributor is then to reduce the velocity of the incoming liquid by dividing it into numerous small jets, each of less velocity than the original. These small jets flow radially inward for a short distance toward the shaft which they surround, impinge against the shaft and against each other, and, assuming the tank to be full of liquid and operating, the incoming liquid of now greatly diminished velocity and no longer any definite direction of flow emerges from under the bottom of the distributor and spreads out as it flows uniformly toward the periphery of the tank.

Concentric with and of greater diameter than the distributor is provided one or more circular baffles 25 and 25a for the purpose of still further equalizing and quieting the flow of liquid. It has been observed that local currents, short circuits or inequalities in the flow of liquid in a tank are propagated almost entirely on the surface of the liquid and that these can be checked and equalized by means of a baffle extending part way below the surface of the liquid. For the first circular baffle 25, an imperforate ring of thin metal is used suspended above the surface of the liquid and extending part way into it. This serves the double purpose of breaking up local currents and of holding back any scum or lighter impurities which may be floating on the surface. This scum remains inside the baffle ring until it loses its air, when it sinks to the bottom and passes on with the main portion of liquid. For the second and subsequent concentric circular baffles 25a a metallic screen with openings of from $\frac{1}{8}''$ to $\frac{1}{2}''$ is used. This also breaks up and equalizes local currents and offers less resistance to the flow of liquid than does a solid ring, since not all the liquid is forced to flow under the screen but a portion passes thru the meshes of the screen. It may be preferred, however, to employ screen or perforate or imperforate metal or a combination of these materials or any other material which suits the purpose i. e. that of constructing a circular baffle for the purpose of checking local currents in a tank, equalizing the flow and holding back scum and floating solids.

On account of the fact that the partitions in this tank are flat and horizontal it is necessary to remove the sediment or mud from them entirely by mechanical means. For this purpose, a simple and efficient type of scraper 26 is provided. Each scraper consists of a strip of metal (for example $\frac{1}{2}''$ thick by $4''$ wide) bent into the form of a spiral and resting by its own weight on the surface of the circular horizontal partition. The inside or central end of the spiral is bolted loosely to a short attachment or clamp 27 which, in turn, is fastened tightly to an axle or shaft 28 in the center of the tank.

The ordinary scrapers employed in moving sediment toward or away from the center of a cylindrical tank consist of heavy rigid arms attached to a central shaft and carrying a multiple of straight or curved blades set at such an angle that as the shaft rotates, the blades plough thru the sediment, moving it in the desired direction. In a wide tank the leverage of these stirring arms becomes very considerable, since they are supported only at one end, and special provision must be made to hold them rigidly in position so that the scraping blades maintain a definite distance from the surface which they are scraping.

The scrapers here shown have the advantage that all their weight is supported by the horizontal partitions on which they rest, and the only strain thrown on the attachment or on the end of the scraper next the axle is the slight pulling and bending strain caused by the very slow rotation of the axle. Consequently, these scrapers may be made of much lighter material, and since they present only a thin edge to the vertically settling sediment, no opportunity is given the latter to build up and ride around on the scraper arms themselves.

It is preferable to construct these scrapers substantially in the shape of a logarithmic spiral, that is a tangent to any portion of the spiral makes a constant angle with a radial line drawn from the central axis to that point. By rotating a scraper of such a shape, the sediment is pushed smoothly and uniformly outward at a constant rate. In the illustration a logarithmic spiral with a constant angle of 60°, is shown altho other angles of between 45° and 70° might also be used. Angles of less than 45° might have too much tendency to rotate the sediment instead of pushing it outward, while spirals with greater constant angles than 70° would need to be of excessive length. Instead of a spiral with a constant angle of approximately 60°, I may prefer some modification, for instance, starting near the center where there is less sediment with an angle of say 50° and increasing the angle of the spiral to, say, 70° at the extreme outer end.

This type of scraper, while it might be used for scraping sediment toward the center of a tank, is particularly adapted to pushing it toward the periphery as applied in this invention, since if excessive resistance should be caused by the quantity or quality of the sediment moved, the curved arms of the scraper would simply bend inward temporarily to form a more acute angle with their path of rotation (a greater angle with the radius).

This scraper, it will be noted, requires absolutely no heavy supporting arms, to hold it in position, which is an important advantage in that it is easier and cheaper to construct and maintain, no surfaces are exposed on which mud may settle and ride around without being scraped, and less disturbance of the liquid in the tank is produced by the rotation of the scraper.

The rotation of the axle and the scrapers is motivated by any convenient means of obtaining a slow, constant rotation, such as a worm and gear wheel drive combined with a back-geared meter.

Directly under each horizontal circular partition 18 and concentric with and surrounding the central shaft or axle 28, is suspended a clear juice or clear liquid outlet 29 of very similar principle and construction to the distributor previously described for equalizing the flow of the incoming liquid. These outlets consist of hollow annular rings 30, with imperforate tops, bottoms and outside cylinders and perforate inner cylinders. Attached to each outlet is a pipe 31 extending horizontally to the periphery of the tank, thence thru the side of the tank to any convenient arrangement for receiving the clear liquid as the box 32. The rate of flow of liquid from each outlet may be controlled by a valve or by any other appropriate device.

The object of these clear juice outlets is to provide means for equalizing and reducing disturbances in the flow of liquid toward the outlet pipe. If, for example, the outlet were merely a pipe with its open end near the center of the tank, the rush of liquid toward the open end of the pipe would set up disturbances very similar but in the reverse direction to those which would take place if the liquid were entering instead of leaving at this point. The flow of liquid thru the outlet pipes must necessarily be of comparatively high velocity, compared to the rate of flow in the tank. The circumferential holes in the inner cylinder of the annular juice outlets, having a combined area greater than the area of the outlet pipe, reduce the abruptness of the necessary increase in velocity at this point, and furthermore being spaced approximately equally around the central shaft, afford an equal opportunity for liquid to flow in radially from each and every portion of the periphery of the tank, instead of inducing currents from any particular portion. The holes or perforations have been located in the inner cylinder of the annular juice outlet in order to get them as nearly as possible in the center of the tank.

The bottom is in the form of a double cone, the angle of slope of the upper cone 11 being comparatively less than that of the lower cone 12. This form has several advantages. In order to draw off a highly concentrated sediment or mud with as little as possible liquid content it is desirable to provide a sediment chamber of considerable height and steeply sloping bottom so that the particles of sediment as they settle downward and converge toward the central axis gradually squeeze out the liquid and pack together at the bottom in the form of a heavy mud. A steep slope is also desirable in that it facilitates the movement of the sediment toward the central mud outlet and minimizes its tendency to adhere to the sides. But, as has been shown previously, a comparatively wide, shallow tank is desirable for efficiency in controlling the flow of juice, and the combination of a very wide tank with a very steep sloping cone bottom would necessitate making a cone bottom of excessive depth and volume compared with the main body of the tank. By constructing the tank bottom in the form of two cones, the upper of which slopes at a comparatively small angle from the horizontal, the advantage of a steep sloping bottom cone is retained without unduly increasing the depth or volume of the sediment chamber.

A further advantage of this new type of tank bottom is that it may be supported by means of horizontal I beams under the shallow cone, whereas an ordinary tank with a steep cone bottom is usually supported by means of columns attached by lugs to the sides of the tank. In a large tank whose contents may weigh more than one hundred tons, this is a matter of considerable importance, since supporting such a tank by attachments to its sides tends to set up distortional strains which may cause leakage or even collapse of the tank.

One of the main objects of this invention is to so control and direct the course of the liquid as to utilize to best advantage the entire available volume of the tank. This is accomplished as follows: Starting with an empty tank the dirty liquid enters thru the pipe 22 and the distributor 24 and spreads over the top horizontal circular partition 18, after which it falls over the edges of the partition and drops to the bottom of the tank. As in filling any other type of tank, considerable foam or scum is thus produced. This scum covers the surface of the liquid as it gradually fills up, until it reaches the lowest horizontal partition 18'. Since this partition is flat and horizontal and without any vertical partition, skirt or other obstruction, the blanket of foam, air bubbles, etc. cannot be entrapped, but is forced out to the only available opening 20, at the periphery and continues to rise to the next compartment, being forced out from each successive horizontal partition in turn as soon as that partition becomes covered with liquid. This is a definite advantage of the flat partitions. Whereas, in filling compartment tanks which have cone shaped partitions the scum which rises to the highest point of each compartment, contaminates the clear liquid and makes it necessary to return this into circulation for some time after the tank has been filled, this tank may be put into continuous operation immediately after filling. In fact clear settled liquid may be drawn off from the lower compartment, if desired, before the tank is more than half filled.

As soon as the tank is completely full, the outlet valves 33 are opened so as to allow an approximately equal flow from each compartment and the continuous operation of the tank begins. Liquid continues entering the distributor 24 now partially or completely submerged, emerges thru the perforations of the inner cylinder wall of 24 in a number of horizontally opposed jets of reduced velocity, passes under and over the distributor 24, and if distributor 24 is entirely submerged, continues outward until it encounters the first circular baffle 25. At this point, all foam, air bubbles and scum have had an opportunity to rise to the surface and are restrained and held back. Also any direct currents or waves tending to pass rapidly over the surface are checked, deflected and equalized on striking this circular baffle. The foam and scum withheld within the confines of baffles 25 gradually loses its supporting air bubbles, and sinks to the bottom and passes outwardly under the first baffle 25. The second circular baffle 25 acts in conjunction with the first in further quieting any disturbances, currents or wave motion which may have gotten past the first baffle. If the second baffle is made of perforated metal or screen the liquid flows thru it and under it uniformly with only slightly less velocity at the surface than underneath. From this second baffle 25 the liquid continues outwardly in a steady, uniform flow of constantly decreasing velocity on account of the increasing area. Under ordinary operating conditions the outward velocity past the periphery of the top horizontal partition is of the order of six inches per minute, so that to all appearances the liquid at this point is practically stationary.

During the outward progress of the liquid, its suspended solids are gradually settling and depositing on the surface of the top horizontal partition 18. In the case of cane juice nearly all the heavier particles have generally settled out by the time the juice reaches the edge of the top partition 18, leaving only a comparatively few lighter particles still in suspension. The heavy sediment depositing on the partition is pushed gradually outward by the slowly rotating spiral scrapers 26 until it reaches the periphery of the partition 18, where it drops off and settles to the bottom of the tank. The fact that this portion of sediment thus passes again thru the liquid from which it has already settled is not a detriment as might be supposed but, at least in the case of cane juices, has a certain advantage. It is well known that the greatest difficulty in clarifying cane juices is caused by a small portion of very fine suspended matter such as cane wax and the like which of themselves would settle out very slowly if at all, but in the presence of sufficient other more rapidly settling matter may be occluded and dragged down by the latter. In this then, the heavy sediment dropping continuously from the edges of the partitions has another opportunity to encounter and drag down very fine particles which may have escaped the preliminary settling in the top compartment. This beneficial feature is not peculiar to the tank here described, but is possessed by other types of compartment tanks. My tank does, however, have the peculiar advantage that the heavy sediment dropping from the top partition falls thru the juice at its point of lowest velocity, at the periphery of the tank, where there is no danger of agitation and remixing.

The liquid after reaching the periphery of the top horizontal partition 18 passes downward thru opening 20 between this partition and the side of the tank 10. The greater portion continues downward past the second partition 18, but a certain proportion, about 1/5 in the tank shown in the drawings proceeds radially inward between the first and second partitions of compartment 15 at a gradually increasing velocity until it reaches the clear juice outlet 29 and thence out thru the draw-off pipe 31 attached thereto.

Similarly, a portion of the liquid passing the second horizontal partition 18 is drawn into the compartment 16 and so on thru successive compartments.

Any suspended material which has not dropped directly down along the sides of the tank thru openings 20 to the bottom proceeds for a part of its travel with the liquid into each compartment, but since the motion of the liquid is so very slow at the periphery of the tank the suspended material has ample time to settle out before it has traversed more than a short distance toward the center. The spiral scrapers 26 constantly push this mud out as it deposits so that there is no danger of its reaching the vicinity of the juice outlets at the center.

The sediment, after passing the last horizontal partition 18' falls to the first cone 11 of the tank bottom, thence slides by gravity, assisted by a slow moving scraper 34, to the second cone, where it compacts and is finally discharged thru the mud outlet 35. The rate of outlet flow being regulated by a valve or other convenient device.

It has been noted in some instances that the mud from cane juices occasionally liberates bubbles of air or gas due either to some form of decomposition or to minute air bubbles entrained and carried down with the mud. This has given trouble with certain types of tanks, but in the tank here shown the only trouble such bubbles could cause would be, possibly, in the bottom compartment. By closing the bottom clear juice draw-off in such an emergency any bubbles rising from the mud carrying particles of mud upward with them would strike the bottom of the lowest horizontal partition 18' proceed in the only possible direction toward the periphery of this partition and thence upward along the side 10 of the tank without causing any trouble or disturbance to the clear liquid in the other compartments.

A final point to be noted in connection with the flow of liquid in this tank is that all the liquid is compelled to flow horizontally for the greatest distance possible in any given diameter of tank. Each particle of liquid must traverse a horizontal distance equivalent to practically the whole diameter of the tank, that is it enters in the upper center, travels to the extreme outside at a uniformly diminishing velocity, deposits its sediment and returns to the outlets in the lower center at a uniformly increasing velocity. Other types of tanks have inlets at the center and outlets at the periphery and some may have inlets at the periphery and outlets at the center, thus causing the liquid to traverse only half the diameter of the tank. This greater distance of directed flow between the inlets and the outlets in my tank is a distinctive and readily appreciable advantage.

From the foregoing it will be obvious that there is here provided an improved settling tank for the continuous separation of solids from liquids which is so constructed that the turbid and turbulent liquid entering in the upper central portion of the tank is rapidly quieted and constrained to flow smoothly and with uniformly decreasing velocity in a horizontally radial direction to the extreme outer portion of the tank, whence it is forced to return in a horizontally radial direction with uniformly increasing velocity to especially designed outlets in the lower central portions of the tank, thus affording ample time and favorable conditions for the settling out of suspended solids. It is furthermore evident that a new and efficient mechanical means of removing the sediment which settles from the liquid during its horizontal flow, and of doing so with little or no disturbance to and at as great as possible a distance from the outflowing clear liquid. It is also evident that a means of utilizing the advantages of a steep conical bottom for compacting this sediment before removal, without unduly increasing the proportionate volume of the bottom and that at the same time an efficient means of supporting a tank of steep conical bottom is provided.

Having thus described my invention, what I claim and desire to secure by Letters Patent is:—

1. An apparatus for separating the finely divided solids from liquids in which they are suspended which comprises a container, a set of superposed flat horizontal partitions therein so formed as to provide circumscribing passage-ways for the downward flow of liquid between the partitions and the enclosing wall of the container only, means for delivering liquid to be separated onto the upper partition and adjacent to the center thereof whereby it may flow outwardly and over the edge of said partition to produce gravitational separation of the finely divided solids and the liquid as the solids successively flow through the passage-ways between the partitions and the wall of the tank, and means adjacent the center of the partitions and at the tops of the successive compartments formed thereby for drawing off the liquid from which the suspended solids have separated said means including a screened annulus to prevent rapid currents at the draw-off points.

2. An apparatus for separating the finely divided solids from liquids in which they are suspended which comprises a container, a set of superposed flat horizontal partitions therein so formed as to provide circumscribing passage-ways for the downward flow of liquid between the partitions and the enclosing wall of the container only, means for delivering liquid to be separated onto the upper partition and adjacent to the center thereof whereby it may flow outwardly and over the edge of said partition to produce gravitational separation of the finely divided solids and the liquid as the solids successively flow through the passage-ways between the partitions and the wall of the tank, means adjacent the center of the partitions and at the tops of the successive compartments formed thereby for drawing off the liquid from which the suspended solids have separated said means comprising a screened annulus and a conduit leading therefrom, and means above each of the partitions for moving accumulated solids outwardly over the edges of the partitions whereby they may have an unobstructed flow to the bottom of the container.

3. An apparatus for separating finely divided solids from liquids within which they are suspended which consists of an enclosing container to be filled with liquid, means forming a series of superposed compartments enclosed by the container and communicating with each other only around the horizontal partition floors thereof, means in the uppermost compartment for delivering a liquid with its suspended solid to the center of said compartment, means in each of the subjacent compartments for drawing off a clear liquid therefrom at the center of said respective compartments, said means comprising an annular ring one of the boundary faces of which is perforated, and means moving over the floor of the compartments for forcing accumulated solid particles outwardly over the edge of the floor whereby the particles may have an unobstructed flow to the bottom of the container.

4. A settling tank of the class described, having an inlet member at the top thereof from which liquid is delivered to flow inwardly radially and a plurality of concentric members circumscribing said inlet members, certain of said members being perforate, through which the liquid may have restricted flow and, intermediate members, said intermediate members being imperforate whereby turbulence of the liquid will be diminished.

5. An apparatus for separating finely divided solids from the liquid in which they are suspended which consists in providing a tank, a plurality of spaced superposed partition floors therein dividing the tank into a plurality of settling compartments, said compartments communicating with each other at the perimeters of the partition floors, means for delivering a liquid to the center of the uppermost compartment, rotating scrapers in each of said compartments to force sludges over the peripheries of said partition floors, means for drawing off the separated solids from the bottom of the lowermost compartment, means disposed centrally of intermediate compartments and adjacent the top of each of said compartments to continuously draw off liquid from said compartments and vertically aligned passage-ways through the partition floors of all of said compartments whereby suspended solids in the liquid flowing through the passage-ways may have unrestricted flow through the series of passageways to the bottom of the tank, said openings being of relatively small area as compared with the area of the compartments with which they communicate whereby downward velocity of the liquid and its particles will be obtained as the liquid passes downwardly through the openings and whereby the gravitational movement of the separating solids will be increased by the velocity of the flowing through the restricted openings.

6. An apparatus of the class described comprising a cylindrical tank, a plurality of flat partition floors disposed in horizontal spaced relation to each other within the tank and of a diameter less than the inside diameter of the tank whereby an unrestricted passageway will occur along the wall of the tank from top to bottom, means at the center of each compartment occurring between adjacent partitions and directly beneath the uppermost partition of said compartment and drawing off liquid from said compartment at a reduced velocity, means within the uppermost compartment for introducing liquid into said compartment at reduced velocity from the velocity of the liquid supplied, said means comprising a hollow cylindrical member of ring-shape the inner wall thereof being perforated to permit inward axial flow of liquid to the compartment and the outer wall thereof being imperforate and acting as a baffle for the liquid, tending to flow outwardly from the zone of entry.

7. An apparatus of the class described comprising a cylindrical tank, a plurality of flat partition floors disposed in horizontal spaced relation to each other within the tank and of a diameter less than the inside diameter of the tank whereby an unrestricted central passageway will occur along the wall of the tank from top to bottom, means at the center of each compartment occurring between adjacent partitions and directly beneath the uppermost partition of said compartment for drawing off liquid from said compartment at a reduced velocity, means within the uppermost compartment for introducing liquid into said compartment at reduced velocity from the velocity of the liquid supplied, said means comprising a hollow cylindrical member of ring-shape the inner wall thereof being perforated to permit inward axial flow of liquid to the compartment and the outer wall thereof being imperforate and acting as a baffle for the liquid tending to flow outwardly from the zone of entry, and traveling scrapers having blades describing logarithmatical curves which blades rest upon said partition floors and act to move deposited sediment outwardly to a zone of low velocity as created at the vertical circumscribing passageway along the side wall of the tank.

8. A settling tank comprising a cylindrical body, an end member in the shape of an inverted cone and a frusto conical section integrally uniting said cylindrical body and said conical member, a central driving shaft operatively positioned therein, a plurality of horizontal partitions extending across said cylindrical body, sediment scrapers resting on said partition and being driven by said central shaft, an inlet pipe terminating in an annular discharge member having perforations on its inner side, an imperforate baffle concentric to said annular member, perforate members radially extending from said imperforate baffle, a plurality of draw-off outlets in the form of an annulus having a square section, and inlet perforations on their inner faces and conduits leading from said draw-off inlets, and a draw-off for sediments near the apex of said inverted conical member.

HERBERT SAMUEL WALKER.